United States Patent [19]
Freifeld et al.

[11] 3,986,989
[45] Oct. 19, 1976

[54] CELLULAR VINYL HALIDE RESIN COMPOSITIONS AND A PROCESS FOR THEIR PRODUCTION

[75] Inventors: Milton Freifeld, Boonton; Robert E. Lally, Englishtown, both of N.J.

[73] Assignee: Tenneco Chemicals, Inc., Saddle Brook, N.J.

[22] Filed: Aug. 28, 1974

[21] Appl. No.: 501,346

[52] U.S. Cl. .............................................. 260/2.5 P
[51] Int. Cl.² ........................................... C08J 9/02
[58] Field of Search ................................. 260/2.5 P

[56] References Cited
UNITED STATES PATENTS

| | | | |
|---|---|---|---|
| 3,197,423 | 7/1965 | Ackerman | 260/2.5 P |
| 3,394,090 | 7/1968 | Hayer | 260/2.5 P |
| 3,736,273 | 5/1973 | Hatano et al. | 260/2.5 B |

*Primary Examiner*—John Kight, III
*Attorney, Agent, or Firm*—Evelyn Berlow

[57] ABSTRACT

Cellular vinyl halide resin compositions are prepared by adding to a vinyl halide resin plastisol a chemical blowing agent, such as azodicarbonamide, and an activator for the blowing agent that contains a zinc salt and a strontium salt and heating the resulting composition at a temperature at which the blowing agent will decompose and the vinyl halide resin will fuse.

10 Claims, No Drawings

CELLULAR VINYL HALIDE RESIN COMPOSITIONS AND A PROCESS FOR THEIR PRODUCTION

This invention relates to cellular vinyl halide resin compositions and to a process for their production.

Cellular or foamed vinyl halide resin compositions are commonly produced by incorporating a chemical blowing agent into a vinyl halide resin plastisol and, after the plastisol has been formed into the desired physical configuration, heating the plastisol to convert it into a gel and then into a cellular plastic. In order to obtain a foamed product having the desired cell structure, the blowing agent must decompose and liberate a gas while the vinyl halide is in a fluid or semi-fluid state, with best results being obtained when the blowing agent decomposes rapidly during the fusion of the resin.

Of the many nitrogen-containing compounds which have been disclosed as chemical blowing agents, azodicarbonamide is the blowing agent that is most commonly used in the production of cellular vinyl halide resins. In its pure state, azodicarbonamide decomposes at temperatures above 210° C.

It is known that organic salts of lead, zinc, barium, and cadmium have an activating effect on azodicarbonamide; that is, they tend to lower its decomposition temperature to about 150° to 200° C. There are, however, disadvantages to the use of these salts as activators in the production of cellular vinyl halide resin compositions. Cadmium salts, which are toxic and relatively expensive, often cause sulfide staining in the foamed products. In many applications, the lead and barium salts, which are also toxic, do not lower the decomposition temperature of the azodicarbonamide sufficiently for gas liberation to occur rapidly and completely during the fusion of the vinyl halide resin. Zinc salts are less toxic than cadmium, barium, and lead salts, but when they are used alone their activity is difficult to control, and the products formed are generally of poor quality. These foamed products are characterized by high densities, poor surfaces, and non-uniform, coarse cell structure. Because the zinc salts cause decomposition of the vinyl halide resins upon heating to the temperature required for the decomposition of the blowing agent and the curing of the plastisols, the foamed products often have poor color and color stability. When alkaline earth metal salts are used in combination with zinc salts to activate the blowing agent, they often retard the catalytic effect of the zinc salts so that there is only a small lowering of the decomposition temperature of the blowing agent.

In accordance with this invention, it has been found that low density cellular vinyl halide resin compositions having high uniformity and fineness of cell structure can be prepared by adding to a vinyl halide resin plastisol that contains azodicarbonamide as its blowing agent an activator that is a mixture of organic salts of zinc and strontium and heating the resulting composition to decompose the azodicarbonamide and fuse the vinyl halide resin.

The relatively inexpensive mixtures of zinc and strontium salts provide a degree of activation previously obtainable only when a lead salt was used, and they do not introduce problems of toxicity and sulfide staining. The effectiveness of these activator mixtures is surprising inasmuch as strontium salts when used alone do not cause a lowering of the decomposition temperature of azodicarbonamide. In addition to activating the blowing agent, the mixtures of zinc and strontium salts impart heat and light stability to the vinyl halide resin compositions.

The zinc salts and the strontium salts that are present in the activator mixtures are derived from organic monocarboxylic acids having from 6 to 24 carbon atoms, phenol, or alkylphenols. The useful acids include saturated and unsaturated aliphatic, aromatic, and alicyclic monocarboxylic acids. Examples of these acids include hexanoic acid, heptanoic acid, 2-ethylhexanoic acid, octanoic acid, nonanoic acid, n-decanoic acid, isodecanoic acid, neodecanoic acid, lauric acid, myristic acid, stearic acid, arachidic acid, behenic acid, oleic acid, linoleic acid, erucic acid, naphthenic acid, benzoic acid, p-tert.butylbenzoic acid, salicylic acid, ricinoleic acid, $\alpha$-hydroxystearic acid, monobutyl maleate, monodecyl phthalate, and the like. The alkylphenols from which the salts may be derived include n-butylphenol, tert.-butylphenol, dibutylphenol, octylphenol, nonylphenol, dinonylphenol, didecylphenol, and the like. The activator mixtures contain at least one of the aforementioned zinc salts and at least one of the aforementioned strontium salts in the amount of about 0.1 part to 10 parts by weight of strontium salt per part by weight of zinc salt. Mixtures that contain from 0.2 part to 1 part by weight of strontium salt per part by weight of zinc salt are generally preferred because they provide excellent control of foam properties over a wide range of processing conditions.

In most cases the plastisol formulations contain from 1 part to 10 parts by weight of azodicarbonamide and from 1 part to 5 parts by weight of the activator mixture per 100 parts by weight of the vinyl halide resin. Particularly good results are obtained when the plastisol contains from 2 parts to 5 parts by weight of azodicarbonamide and from 2 parts to 4 parts by weight of the activator mixture per 100 parts by weight of the vinyl halide resin. The best results are obtained when about 0.5 part to 1.5 parts by weight of the activator mixture is used per part by weight of azodicarbonamide.

The vinyl halide polymers that may be present in the compositions of this invention are the resinous products obtained by the polymerization of a vinyl halide in the presence or the absence of a copolymerizable monomer. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer, such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those that are prepared from monomer mixtures that contain at least 70% of vinyl halide and up to 30% of the comonomer.

In addition to the vinyl halide resin, azodicarbonoamide, and activating mixture, the compositions of this invention contain conventional ingredients, such as plasticizers, viscosity modifiers, other heat and light stabilizers including epoxidized oils and organic phosphites, fillers, pigments, dyes, extenders, and other additives in the amounts ordinarily employed for the purpose indicated. Illustrative of the plasticizers that may be used in these compositions are dibutyl phthalate, dioctyl phthalate, diphenyl phthalate, butyl benzyl phthalate, triphenyl phosphate, tricresyl phosphate, octyl diphenyl phosphate, dibutyl sebacate, dioctyl sebacate, dioctyl adipate, didecyl adipate, dioctyl azelate, diethylene glycol dipelargonate, dipropylene glycol dibenzoate, and the like.

The compositions may be prepared by any suitable and convenient procedure. For example, the vinyl halide resin may be blended with the plasticizer, azodicarbonamide, activator mixture, and other additives until a uniform composition is obtained. Alternatively, the blowing agent, activator mixture, and other additives may be added to a vinyl halide resin plastisol. The azodicarbonamide is preferably added as a predispersed paste in a portion of the plasticizer; the metal salts may, if desired, be added as a solution in a solvent such as a hydrocarbon, alcohol, or glycol ether. The compounded plastisols may be applied to a substrate, such as cloth or paper, by conventional techniques. The resulting film may be gelled by heating it at a temperature in the range of about 140° C. to 160° C. for about 1 to 5 minutes and fused and foamed by further heating at a temperature in the range of about 165° C. to 210° C.

The invention is further illustrated by the following examples. In these examples all parts are parts by weight, and all percentages are percentages by weight.

EXAMPLE 1

A series of foamed polyvinyl chloride compositions was prepared using the following formulation:

|  | Parts |
|---|---|
| Polyvinyl chloride - Dispersion Resin | 100.0 |
| 2,2,4-Trimethyl-1,3-pentanediol isobutyrate benzoate | 40.0 |
| Titanium dioxide | 5.0 |
| Dioctyl phthalate | 7.5 |
| Azodicarbonamide | 2.5 |
| Activator mixture | 3.0 |

The ingredients were blended until uniform plastisols were obtained. The plastisols were drawn down on aluminum panels to form films having a thickness after gelling of 25 mils. The films were gelled by heating them in a forced-draft oven at 120° C. for 5 minutes.

After their thicknesses had been measured, the gelled films were expanded by heating them at 185° C. for 6 minutes or at 205° C. for 3 minutes. The thicknesses of the expanded films were then measured.

The ratio of the thickness of the expanded film to that of the gelled film is taken as an indication of the relative degree of expansion of the composition. This ratio, which is commonly called the Blow Ratio, is in good agreement with the foam density of the compositions. For compositions containing 3 parts of azodicarbonamide per 100 parts of polyvinyl chloride, the best cell structure is obtained at a Blow Ratio of about 5.0. This corresponds to a density of about 13 pounds per cubic foot.

The composition of the activator mixtures that were used, the conditions under which the films were expanded, and the results obtained are given in Table I. In this table, the surface quality and cell quality were rated as follows:

| Rating | Surface Quality | Cell Quality |
|---|---|---|
| Excellent | Very Smooth | Very fine and uniform |
| Good | Smooth | Fine and uniform |
| Fair | Slight Roughness | Medium-coarse |
| Poor | Rough | Coarse and non-uniform |
| Very Poor | Very Rough | Very coarse and non-uniform |

Table I

| Activator Mixture Composition | A | | B | | Comparative Activator | |
|---|---|---|---|---|---|---|
|  | 9% Zn as zinc 2-ethylhexoate 5% Sr as strontium 2-ethylhexoate | | 9 % Zn as zinc 2-ethylhexoate 2.5 % Sr as strontium 2-ethylhexoate | | 9 % Zn as zinc 2-ethylhexoate | |
| Expansion Cycle | 185° C. for 6 minutes | 205° C. for 3 minutes | 185° C. for 6 minutes | 205° C. for 3 minutes | 185° C. for 6 minutes | 205° C. for 3 minutes |
| Blow Ratio | 5.2 | 5.1 | 5.3 | 4.9 | 5.9 | 5.3 |
| Surface Quality | Good | Good | Good | Good | Very Poor | Good |
| Cell Quality | Good | Fair | Good | Good | Fair | Poor |

EXAMPLE 2

A series of foamed polyvinyl chloride compositions was prepared using the following formulation:

|  | Parts |
|---|---|
| Polyvinyl chloride - Dispersion Resin | 100.0 |
| Titanium dioxide | 2.5 |
| Azodicarbonamide | 5.0 |
| Dioctyl phthalate | 52.5 |
| Activator Mixture | 3.0 |

Films were prepared, gelled, and expanded by the procedure described in Example 1. The composition of the activators that were used, the conditions under which the films were expanded, and the results obtained are given in Table II.

EXAMPLE 3

A series of foamed polyvinyl chloride compositions was prepared using the following formulation:

|  | Parts |
|---|---|
| Polyvinyl chloride - Dispersion Resin | 100.0 |
| Titanium dioxide | 2.5 |
| Azodicarbonamide | 3.0 |
| Dioctyl phthalate | 50.5 |
| Butyl benzyl phthalate | 25.0 |
| Activator mixture | 3.0 |

Films were prepared, gelled, and expanded by the procedure described in Example 1. The composition of the activator mixtures, the conditions under which the films were expanded, and the results obtained are given in Table III.

and from 2 parts to 4 parts by weight of the activator mixture per 100 parts by weight of the vinyl halide resin.

Table II

| Activator Mixture Composition | A | | B | | Comparative Activator | |
|---|---|---|---|---|---|---|
| | 9 % Zn as zinc 2-ethylhexoate 5 % Sr as strontium 2-ethylhexoate | | 9 % Zn as zinc 2-ethylhexoate 2.5 % Sr as strontium 2-ethylhexoate | | 9 % Zn as zinc 2-ethylhexoate | |
| Expansion Cycle | 185° C. for 6 minutes | 205° C. for 3 minutes | 185° C. for 6 minutes | 205° C. for 3 minutes | 185° C. for 6 minutes | 205° C. for 3 minutes |
| Blow Ratio | 2.7 | 6.4 | 3.0 | 4.7 | 4.4 | 6.1 |
| Surface Quality | Good | Good | Good | Good | Very Poor | Fair |
| Cell Quality | Good | Good | Good | Fair | Poor | Very Poor |

Table III

| Activator Mixture Composition | A | B | Comparative Activator |
|---|---|---|---|
| | 9% Zn as zinc 2-ethylhexoate 5% Sr as strontium 2-ethylhexoate | 9% Zn as zinc 2-ethylhexoate 2.5% Sr as strontium 2-ethylhexoate | 9% Zn as zinc 2-ethylhexoate |
| Expansion Cycle | 205° C. for 3 minutes | 205° C. for 3 minutes | 205° C. for 3 minutes |
| Blow Ratio | 5.0 | 5.3 | 5.7 |
| Surface Quality | Good | Good | Fair |
| Cell Quality | Good | Excellent | Very Poor |

In each of the examples, the high blow ratios obtained using the Comparative Activator are indicative of "over-blow", which is caused by the over-activity of the zinc salt and which results in poor foam quality. When the zinc-strontium salt activators were used, the quality of the foamed products was good.

Each of the other zinc salts and strontium salts disclosed herein can also be used in activator mixtures to bring about the expansion of gelled polyvinyl chloride films to form foamed products characterized by good cell quality and good surface quality.

What is claimed is:

1. A composition suitable for the production of cellular vinyl halide resins that comprises (a) a vinyl halide resin plastisol, (b) 1 percent to 10 percent, based on the weight of vinyl halide resin in the plastisol, of azodicarbonamide, and (c) 1 percent to 5 percent, based on the weight of vinyl halide resin in the plastisol, of an activator mixture that contains (1) at least one zinc salt selected from the group consisting of zinc salts of monocarboxylic acids having 6 to 24 carbon atoms, phenol, and alkylphenols and (2) at least one strontium salt selected from the group consisting of strontium salts of monocarboxylic acids having 6 to 24 carbon atoms, phenol, and alkylphenols, said activator mixture containing from 0.1 part to 10 parts by weight of strontium salt per part by weight of zinc salt.

2. A composition as defined in claim 1 wherein the vinyl halide resin is polyvinyl chloride.

3. A composition as defined in claim 1 wherein the activator mixture contains from 0.2 part to 1 part by weight of strontium salt per part by weight of zinc salt.

4. A composition as defined in claim 1 that contains from 2 parts to 5 parts by weight of azodicarbonamide 5. A composition as defined in claim 1 that contains from 0.5 part to 1.5 parts by weight of the activator mixture per part by weight of azodicarbonamide.

6. A composition as defined in claim 1 wherein the activator mixture contains strontium 2-ethylhexoate and zinc 2-ethylhexoate.

7. In the process of producing cellular vinyl halide resin compositions by forming a plastisol containing a vinyl halide resin and azodicarbonamide and heating the plastisol to a temperature in the range of about 140°–210° C. to fuse the vinyl halide resin and to decompose the azodicarbonamide, the improvement that comprises incorporating in said mixture before heating 1 percent to 5 percent, based on the weight of vinyl halide resin in the plastisol of an activator mixture that contains (i) at least one zinc salt selected from the group consisting of zinc salts of monocarboxylic acids having 6 to 24 carbon atoms, phenol, and alkylphenols and (ii) at least one strontium salt selected from the group consisting of strontium salts of monocarboxylic acids having 6 to 24 carbon atoms, phenol, and alkylphenols, said activator containing from 0.1 part to 10 parts by weight of strontium salt per part by weight of zinc salt.

8. The process of claim 7 wherein the activator mixture contains from 0.2 part to 1 part by weight of strontium salt per part by weight of zinc salt.

9. The process of claim 7 wherein the amount of activator mixture added is from 2 parts to 4 parts by weight per 100 parts by weight of the vinyl halide resin.

10. The process of claim 7 wherein the activator mixture contains zinc 2-ethylhexoate and strontium 2-ethylhexoate.

* * * * *